United States Patent [19] [11] 4,104,436
Suzuki et al. [45] Aug. 1, 1978

[54] MAGNETIC HEAD CLEANING ARTICLE
[75] Inventors: Osamu Suzuki; Masaki Ueda; Akira Ishii, all of Odawara, Japan
[73] Assignee: Fuji Photo Film Co., Ltd., Minami-ashigara, Japan
[21] Appl. No.: 501,957
[22] Filed: Aug. 30, 1974
[30] Foreign Application Priority Data
Aug. 31, 1973 [JP] Japan ............... 48-102259[U]
[51] Int. Cl.² .................................. B32B 21/06
[52] U.S. Cl. .................. 428/297; 15/210 R; 428/323; 428/337; 428/537
[58] Field of Search ............ 161/151, 158, 162, 164, 161/165, 170, 232; 15/210 R, 104.93; 428/408, 297, 323, 337, 537; 162/98, 148, 150

[56] References Cited
U.S. PATENT DOCUMENTS

| 2,626,884 | 1/1953 | Ewing | 428/408 |
|---|---|---|---|
| 2,897,109 | 7/1959 | Voigtman | 161/151 |
| 2,961,365 | 11/1960 | Sroog | 161/232 |
| 3,334,006 | 8/1967 | Koller | 161/170 |
| 3,396,420 | 8/1968 | Mitchell | 161/151 |
| 3,485,711 | 12/1969 | Fish | 161/170 |
| 3,547,726 | 12/1970 | Tangorra | 161/170 |
| 3,789,452 | 2/1974 | Nemoto | 15/210 R |
| 3,791,608 | 2/1974 | Akashi et al. | 428/408 |
| 3,931,643 | 1/1976 | Kuroe | 15/210 R |

Primary Examiner—James J. Bell
Attorney, Agent, or Firm—Sughrue, Rothwell, Mion, Zinn and Macpeak

[57] ABSTRACT

A durable magnetic head cleaning article which can be used to achieve superior cleaning of a magnetic head, comprising a Japanese paper on a support, the Japanese paper being made of vegetable fibers having a fiber length of about 5 mm or longer and an average fiber diameter of about 10 $\mu$ to 40 $\mu$.

19 Claims, 7 Drawing Figures

MAGNETIC HEAD CLEANING ARTICLE

BACKGROUND OF THE INVENTION

1. Field of the Invention

This invention relates to an article for cleaning a magnetic head.

2. Description of the Prior Art

The recent tendency in the manufacture of magnetic recording and reproducing apparatus has been miniaturization, and cartridges, cassettes and sheets have come into use as magnetic recording media. Under the circumstances, the structure and installation of magnetic recording and reproducing heads have become complicated. The surface of a magnetic head has been heretofore cleaned by hand. However, it has been difficult to completely clean the head surface. Therefore, it has become the practice to clean the head surface using a tape or card which is coated with an abrasive and which has a shape similar to a magnetic tape or card and running the tape or card in a manner similar to a magnetic tape or card. However, these articles for cleaning magnetic heads (hereinafter the term "head cleaner" will be used for brevity), or head cleaning tape and cleaning card, are abrasive tapes or cards, and therefore, if these head cleaners are used improperly, the head surface is worn away and the head can no longer be used.

In addition, these head cleaners have additional defects in that, after they have been used repeatedly, the roughness of the surface thereof tends to be destroyed resulting in a decrease in the cleaning effect obtained. In fact, the durable life of these head cleaners is short, since they become useless after about 10 repeated uses.

SUMMARY OF THE INVENTION

This invention provides a novel article for cleaning a magnetic head which is free from the above described defects and with which a remarkably superior cleaning effect can be obtained.

Accordingly, an object of this invention is to provide a novel magnetic head cleaner which can be used to achieve superior cleaning and which has superior durability over any other type of conventional head cleaner. In particular, the cleaning surface of the head cleaner of this invention substantially does not become smooth due to clogging, and thus the present head cleaner is durable.

More precisely, this invention provides an article for cleaning a magnetic head which is durable and with which superior head cleanng can be obtained. The magnetic head cleaner of this invention comprises a Japanese paper provided on a support, the Japanese paper being made of vegetable fibers having a fiber length of about 5 mm or longer and an average fiber diameter of about 10 $\mu$ to 40 $\mu$.

DETAILED DESCRIPTION OF THE INVENTION

This invention is explained in detail hereinunder with reference to drawings attached hereto.

Figure 1:
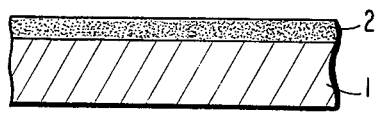
FIG. 1 shows an enlarged sectional view of a conventional head cleaner, where 1 is a support and 2 is an abrasive.

In FIG. 1 showing a sectional view of a cleaning tape made using a conventional technique, 1 is a support such as a polyester, cellulose triacetate or vinyl chloride film, and 2 is an abrasive such as chromium oxide (mesh #10,000) or $\alpha$-hematite which, after being kneaded with a binder, is coated or sprayed on the base support.

Figure 2:
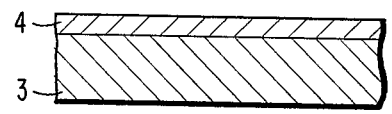
FIG. 2 is an enlarged sectional view of a head cleaner, showing one embodiment of this invention, where 3 is a support and 4 is a Japanese paper layer.

In FIG. 2 showing a sectional view of an embodiment of the magnetic head cleaner of this invention, 3 is a rigid support such as of polyesters such as polyethylene terephthalate, polyethylene-2,6-naphthalate, polybutylene terephthalate; cellulose derivatives such as cellulose triacetate, cellulose acetate propionate; vinyl resins such as polyvinyl chloride; polycarbonate, etc., 4 is a Japanese paper made of vegetable fibers having a fiber length of 5 mm or longer, e.g., from about 5 to 50 mm, and a fiber diameter of about 10 to 40 $\mu$, the Japanese paper 4 being provided on the support by lamination or adhesion. One characteristic feature of the Japanese paper type cleaning tape of this invention is as follows: The interval of the respective fibers of the Japanese paper is about 100 $\mu$ or so, and magnetic powders, dust of the binder and other types of dust adhered to a head to be cleaned are adsorbed in the space of 100 $\mu$ of the long fibers. Thus, dust is not deposited on the surface of the cleaning tape, and therefore, the tape can be effectively used for cleaning for a long time.

Figure 3:
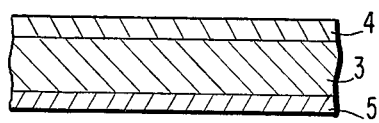
FIG. 3 is an enlarged sectional view of a head cleaner, showing another embodiment of this invention, where 3 is a support, 4 is a Japanese paper layer, and 5 is a backing layer.

FIG. 3 shows another embodiment of this invention, where 3 is a support, and a Japanese paper 4 is provided on one surface of the support 3, and in addition, a backing layer is provided on the opposite surface thereof for the purpose of preventing light transmittance.

The term Japanese paper as used herein describes a paper which is digested and a single fiber formed. The bast fiber of natural vegetable fibers is used as a raw material to produce the single fiber. Bast fibers comprise cellulosic fibers of a length of 3 to 50 mm and a width of 0.01 to 0.08 mm, such as those of flax (*Linum usitatissimum*), hemp (*Cannabis sativa*), jute (*Corchorus capsularis*), ramie (*Boehmeria nivea, Boehmeria tenacissima*), paper mulberry (*Broussonetia kazinoki sieb*), Mitsumata (*Edgeworthia papyrifera*), Ganpi (*Wikstroemia sikokiana Fr. et Sav.*), etc.

The length and width of single fiber and cellulose of these bast fibers are shown in the table below.

TABLE

| | Cellulose | | Single Fiber | |
|---|---|---|---|---|
| | Length (cm) | Width (mm) | Length (mm) | Width (μm) |
| Flax | 40–60 | — | 25–30 | 15–18 |
| Hemp | 100–500 | 0.5–5 | 15–25 | 16–50 |
| Jute | 150–500 | — | 1.5–5 | 20–25 |
| Ramie | 200–400 | — | 150 (average) | 40 (average) |
| Paper Mulberry | 0.6–0.21 | 0.01–0.03 | — | — |
| Mitsumata | 0.3–0.5 | 0.01–0.03 | — | — |
| Ganpi | 0.3–0.5 | 0.01–0.03 | — | — |

Paper mulberry, mitsumata and ganpi are preferred for Japanese paper.

The backing layer can be a dispersion of a pigment or a lubricant having an average particle size (diameter) of about 0.05 to 5 $\mu$, preferably 0.1 to 2 $\mu$, such as carbon black, graphite, carbon black grafted polymer, tungsten disulfide or molybdenum disulfide, dispersed in a binder in a proportion by weight of about 1:1/3 to 1:4/3.

Binders which can be used in this invention are conventional thermoplastic resins, thermosetting resins or mixtures of these resins.

Thermoplastic resins which can be used as the binder are those having a softening point of about 150° C or above, an average molecular weight of about 10,000 to 200,000 and a polymerization degree of about 200 to 1500. Examples of these Thermoplastic resins are vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (such as cellulose acetate butyrate, cellulose diacetate, cellulose triacetate, cellulose propionate, nitrocellulose), styrene-butadiene copolymers, polyester resins, chlorovinyl ether-acrylate copolymers, amino resins and various kinds of synthetic rubber type thermoplastic resins and mixtures of these resins.

These resins are described, for example, in Japanese patent publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72, and U.S. Pat. Nos. 3,144,352; 3,419,420; 3,499,789 and 3,713,887, etc.

Thermosetting resins which can be used as the binder are those having a molecular weight of about 200,000 or less in the form of a coating solution, and the molecular weight thereof becomes infinity due to condensation, addition or a like reaction, when the resin is heated, after being coated and dried. Of these resins preferred resins are those which do not soften or melt until they are decomposed. Examples of thermosetting resins are phenol resins, epoxy resins, polyurethane curing resins, urea resins, melamine resins, alkyd resins, silicone resins, acrylic reactive resins, epoxy-polyamide resins, nitrocellulose-melamine resins, mixtures of a high molecular weight polyester resin and an isocyanate prepolymer, mixtures of a methacrylate copolymer and a diisocyanate prepolymer, mixtures of a polyester-polyol and a polyisocyanate, urea-formaldehyde resins, mixtures of a low molecular weight glycol, a high molecular weight diol and a triphenylmethane-triisocyanate, and polyamine resins, and mixtures of these resins.

These resins are disclosed, for example, in Japanese patent publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, and 28922/72, and U.S. Pat. Nos. 3,144,353; 3,320,090; 3,437,510; 3,597,273; 3,781,210 and 3,781,211, etc.

The backing layer preferably has a thickness of about 0.5 $\mu$ to 5 $\mu$, more desirably about 1 $\mu$ to 3 $\mu$. This is because the light transmittance is to be kept at about 1% or less.

Another characteristic feature of this invention is the length and the thickness of fibers of the Japanese paper which are 5 mm or longer and about 10 to 40 $\mu$, respectively. A suitable thickness for the Japanese paper ranges from about 50 to 200 $\mu$. Advantages due to the use of a paper whose fibers have these characteristics are explained in greater detail below.

Figure 4:
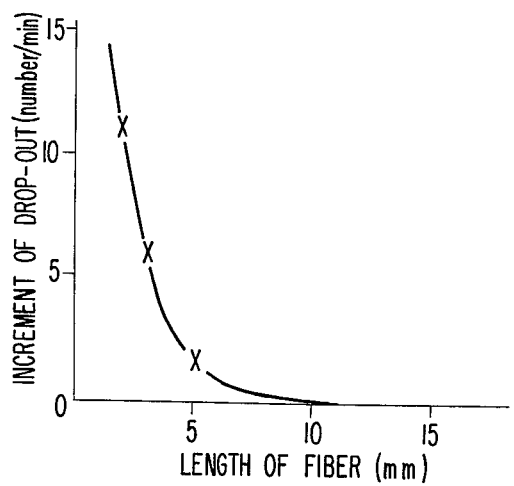
FIG. 4 is a graph showing the relation between the fiber length of the Japanese paper and the incidence of drop-out.

When a Japanese paper of fibers having a length of less than 5 mm is provided on a cleaning tape support, these fibers fall out when contacted with a head to be cleaned, causing drop-out to occur during recording or reproducing. Thus, drop-out difficulty is practically inevitable when a head cleaning tape is used. Although cleaning using the tape can be achieved, the tape can not be utilized practically. FIG. 4 shows the relation between the length of fibers and the incidence of drop-out. The measurement was carried out as follows: A head for a helical scanning type video tape recorder was completely cleaned by hand, and sync-signals were recorded and reproduced in a standard tape. The time of drop-out of 1/6H or more was first counted, and then, after a head cleaning tape having a Japanese paper of fibers having a length of 2 mm, 3 mm, 5 mm, 10 mm or 15 mm, respectively, was run once, the same measurement was carried out with the standard tape to obtain the incidence of drop-out. It is noticed that when a head cleaning tape using fibers having a length of less than 5 mm was used for cleaning, the incidence of drop-out was extremely high.

Regarding the thickness of the fibers, the cleaning effect which is one object of this invention is not sufficient when fibers having a thickness of less than 10 $\mu$ are used, and further, the time necessary for cleaning is long, which is disadvantageous. The relation between the diameter of the fibers and the cleaning effect is shown in FIG. 5 (line 1).

On the other hand, if fibers having a thickness of greater than about 40 $\mu$ are used, a phenomenon of cracking occurs in ferrite chips for recently developed high density heads such as a video head, and the crack damage is remarkable far from the cleaning effect, resulting in a loss of output signals. Thus, the use of fibers having a thickness of greater than 40 $\mu$ was found undesirable.

Figure 5:
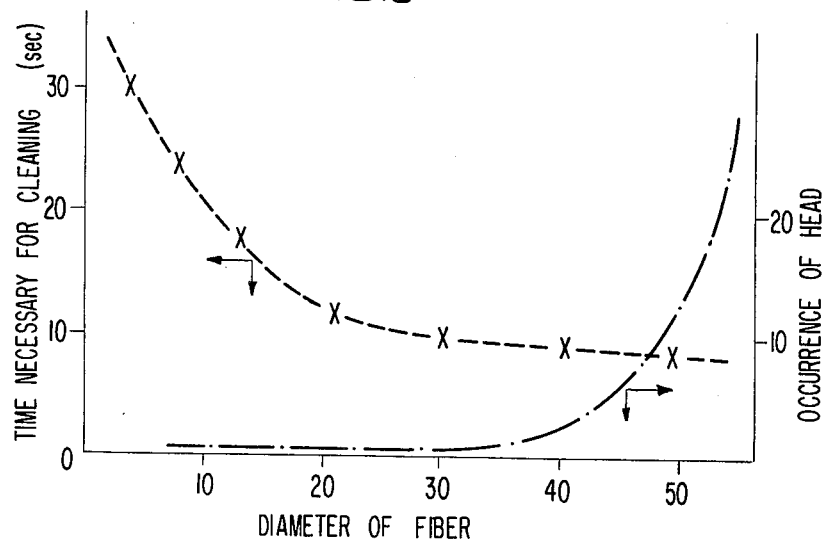
FIG. 5 is a graph showing the relation between the fiber diameter of the Japanese paper and the cleaning effect which can be obtained with the head cleaner (line 1) and the relation between the fiber diameter and the degree of head crack (line 2).

Line 2 in FIG. 5 shows the relation between the diameter of fibers and the occurrence of cracks in a head. It is noticed that the occurrence of cracks abruptly increases when the diameter of the fibers exceeds about 40 $\mu$. On these grounds, the length and the thickness of the fibers of the Japanese paper for a head cleaning tape are critically limited within the range of about 5 mm or longer and about 10 to 40 $\mu$, respectively, for attaining the most advantageous effects.

This invention is explained in greater detail in the following Examples and Comparative Examples. One skilled in the art can easily understand that the components, the proportions thereof, the constitution thereof and the order of steps can optionally be varied as long as they do not exceed the scope of this invention. Accordingly, this invention is not to be construed as being limited only to the illustrated Examples. Unless otherwise indicated, all parts, percents, ratios and the like are by weight.

EXAMPLE 1

|  | parts by weight |
|---|---|
| Carbon Black | 100 |
| Polyurethane | 55 |
| Vinylidene Chloride | 45 |

On a polyethylene terephthalate film having a thickness of 2.5 μ was provided a black backing layer of the above composition and having a thickness of 1.5 μ whereby the transmittance of light from a tungsten light source (4000° K) was controlled to within 1% or less. On the film was laminated a hand-made Japanese paper of fibers having a length of 7 mm and an average thickness of 40 μ, to produce a head cleaning tape having a width of 2.7 mm.

On the other hand, a head for a helical scanning type video tape recorder was clogged to reduce the video output by −25 db (5MHz). A magnetic recording tape having thereon a magnetic recording layer whose ratio of binder to ferromagnetic powder was 1:2 was produced by coating a polyethylene terephthalate film as a support having a thickness of 25 μ with the following coating composition.

|  | parts by weight |
|---|---|
| γ-Fe$_2$O$_3$ (Hc: 250) | 300 |
| Polyester Polyol* | 80 |
| Cellulose Acetate Butyrate | 30 |
| Polyisocyanate** | 40 |
| Soybean Lecithin | 6 |
| Methyl Ethyl Ketone | 400 |
| Butyl Acetate | 500 |

*Condensate of adipic acid and butanediol, having terminal hydroxy groups and a molecular weight of about 1800
**Desmodur L; trade name, produced by Bayer A.G.; 75 wt% ethyl acetate solution; adduct of 3 moles of toluene diisocyanate and 1 mole of trimethylol propane A 5 MHz video signal was recorded on the magnetic recording tape thus produced using a VTR and was continuously run at a speed of 9.5 cm/sec for 24 hours. The reduced output of the videohead was set at −25 db in accordance with the following $$20 \log \frac{Vt}{Vs} (dB).$$

where $Vs$ is the output of the videohead before running and $VT$ is that of the videohead after running.

After the above head cleaning tape was run once on the head, the video output recovered to 0 db. Thus, the cleaning effect of the tape was marked.

Figure 6:
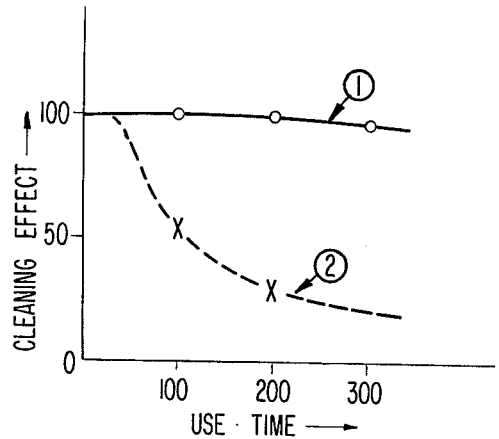
FIG. 6 is a graph showing a comparison of the cleaning effect between a head cleaner of the present invention (line 1) and another type of head cleaner (line 2) relative to the number of times used.

After the head cleaning tape was used repeatedly 300 times for cleaning, the recovery of the output continued quite well as shown in FIG. 6 (line 1). Thus, the practical durability of this cleaning tape was proved to be sufficient. Both the incidence of drop-out and head crack were zero.

EXAMPLE 2

|  | parts by weight |
|---|---|
| Graphite | 100 |
| Polyurethane | 50 |
| Cellulose Triacetate | 40 |

On a polyethylene terephthalate film having a thickness of 3.0 μ was provided a black backing layer of the above composition and having a thickness of 2 μ, and a hand-made Japanese paper of fibers having a length of 10 mm and an average thickness of 30 μ was laminated on the film to produce a magnetic head cleaner. This was tested in the same manner as in Example 1, and the cleaning effect thereof was proved to be sufficient.

EXAMPLE 3

|  | parts by weight |
|---|---|
| Carbon Black | 100 |
| Polyurethane | 45 |
| Vinyl Chloride-Vinyl Acetate Copolymer | 40 |

On a cellulose triacetate film having a thickness of 3.0 μ was provided a black backing layer of the above composition and having a thickness of 1.5 μ, and a hand-made Japanese paper of fibers having a length of 8 mm and an average thickness of 20 μ and laminated on the film to produce a magnetic head cleaner. This head cleaner was tested in the same manner as in Example 1, and the cleaning effect thereof was proved to be sufficient.

EXAMPLE 4

On a polyethylene terephthalate film having a thickness of 2.5 μ was laminated a hand-made Japanese paper of fibers having a length of 12 mm and an average thickness of 35 μ to produce a magnetic head cleaner. This head cleaner was tested in the same manner as in Example 1, and the cleaning effect thereof was proved to be sufficient.

COMPARATIVE EXAMPLE 1

A head cleaning tape was made in the same manner as in Example 1, using a Japanese paper of fibers having a length of 2 mm and a thickness of 30 μ, and the tape was tested also in the same manner as in Example 1. As a result, the cleaning effect of the tape was good in that the video output was recovered to 0 db, but after the head cleaning tape was run and drop-out was measured, the incidence thereof was 15 times/min.

COMPARATIVE EXAMPLE 2

A head cleaning tape was prepared in the same manner as in Example 1 except that fibers having a thickness of 60 μ were used, and the same test was carried out using this tape. As a result, the head chips were damaged and the output was reduced to −30 db, and the head cleaning tape could no longer be practically utilized.

COMPARATIVE EXAMPLE 3

A polyethylene terephthalate support having a total thickness of 25 μ was coated with a coating composition of 300 parts of chromium oxide (10,000 mesh), 70 parts of a vinyl chloride-vinyl acetate copolymer, 20 parts of an epoxy resin (the reaction product of 1 mol of bisphenol A and 1 mol of epichlorohydrin) and 15 parts of a polyamide (having the formula

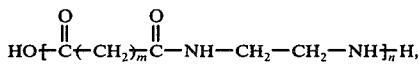

where $m$ is 30 to 40 and $n$ is 5 to 15) which were kneaded in a ball-mill, to provide thereon a layer having a thickness of 15 $\mu$ after drying. The thus prepared head cleaning tape was cut to a size of 12.7 mm in width and 2.5 m in length, as in Example 1. After the head cleaning tape was run once on a head for a video tape recorder whose video output was reduced to $-25$ db, the output recovered to $-17$ db. At the same time, the decrease of head chips was measured and it was 0.65 $\mu$.

The durability of the tape was tested in the same manner as in Example 1, and the result obtained is shown in FIG. 6 (line 2). The upper limit of the practical durability of the tape was up to 10 repeated uses.

Figure 7:
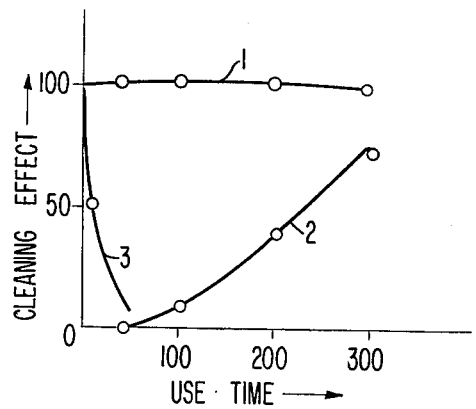
FIG. 7 is a graph showing the comparison of the cleaning effect and durability between a cleaner of the present invention (line 1) and other types of cleaners (lines 2 and 3).

The head cleaning effect and the durability of the respective samples in Example 1 (Sample No. 1), Comparative Example 2 (Sample No. 2) and Comparative Example 3 (Sample No. 3) were tested, and the results obtained are shown in FIG. 7.

From the results in FIG. 7, the following facts are noticed. The head cleaning effect of Sample No. 2 was improved after repeated use, but in the initial stage, head clogging and incidence of drop-out in tape were marked. Sample No. 3 had poor durability and the active life thereof was short. Accordingly, it is apparent that Sample No. 1 of this invention is superior to Samples Nos. 2 and 3 in this point.

Comparing the results of the above Examples and Comparative Examples, it is evident that cleaning tapes of the present invention having a Japanese paper of fibers having a length of about 5 mm or longer and a thickness of about 10 $\mu$ to 40 $\mu$ are superior to the other head cleaning tapes with respect to the head cleaning effect, drop-out and head crack.

While the invention has been described in detail and with reference to specific embodiments thereof, it will be apparent to one skilled in the art that various changes and modifications can be made therein without departing from the spirit and scope thereof.

What is claimed is:

1. An article for cleaning a magnetic head comprising a support having a Japanese paper laminated thereon, the Japanese paper consisting of the bast fibers of natural vegetable fibers having a fiber length of about 5 mm or longer and an average fiber diameter of about 10 $\mu$ to 40 $\mu$.

2. An article for cleaning a magnetic head comprising a support having a Japanese paper laminated onto one surface and a backing layer comprising pigments or lubricants dispersed in a binder on the other surface, the Japanese paper consisting of the bast fibers of natural vegetable fibers having a fiber length of about 5 mm or longer and an average fiber diameter of about 10 $\mu$ to 40 $\mu$.

3. The article as claimed in claim 1, wherein said support is a rigid polyester, cellulose triacetate or vinyl chloride film.

4. The article as claimed in claim 2, wherein said support is a rigid polyester, cellulose triacetate or vinyl chloride film.

5. The article as claimed in claim 3, wherein said support is a polyethylene terephthalate film.

6. The article as claimed in claim 4, wherein said support is a polyethylene terephthalate film.

7. The article as claimed in claim 2, wherein said pigments or lubricants of said backing layer are employed in a proportion of 1:1/3 to 1:4/3 by weight of said binder.

8. The article as claimed in claim 7, wherein said pigment or lubricant of said backing layer comprise particles having an average particle size of about 0.05 to 5 $\mu$.

9. The article as claimed in claim 8, wherein the average particle size of said backing layer particles is 0.1 to 2 $\mu$.

10. The article as claimed in claim 8, wherein said backing layer comprises particles of carbon black, graphite, carbon black-grafted polymer, tungsten disulfide or molybdenum disulfide.

11. The article as claimed in claim 9, wherein said backing layer comprises particles of carbon black, graphite, carbon black-grafted polymer, tungsten disulfide or molybdenum disulfide.

12. The article as claimed in claim 2, wherein said backing layer has a thickness of about 0.5 to 5 $\mu$.

13. The article as claimed in claim 12, wherein said backing layer has a thickness of 1 to 3 $\mu$.

14. The article as claimed in claim 1, wherein said Japanese paper has an interval of about 100 $\mu$ between said bast fibers.

15. The article as claimed in claim 2, wherein said Japanese paper has an interval of about 100 $\mu$ between said bast fibers.

16. The article as claimed in claim 1, wherein said bast fibers are selected from the group consisting of flax, hemp, jute, ramie, paper mulberry, Mitsumata, and Ganpi.

17. The article as claimed in claim 16, wherein said bast fibers are selected from the group consisting of paper mulberry, Mitsumata, and Ganpi.

18. The article as claimed in claim 2, wherein said bast fibers are selected from the group consisting of flax, hemp, jute, ramie, paper mulberry, Mitsumata, and Ganpi.

19. The article as claimed in claim 18, wherein said bast fibers are selected from the group consisting of paper mulberry, Mitsumata, and Ganpi.

* * * * *